US012586012B2

(12) United States Patent
Rakshit et al.

(10) Patent No.: US 12,586,012 B2
(45) Date of Patent: Mar. 24, 2026

(54) PROVIDING UNINTERRUPTED REMOTE CONTROL OF A PRODUCTION DEVICE VIA VIRTUAL REALITY DEVICES

(71) Applicant: International Business Machines Corporation, Armonk, NY (US)

(72) Inventors: Sarbajit K. Rakshit, Kolkata (IN); Sudheesh S. Kairali, Kozhikode (IN); Binoy Thomas, Kozhikode (IN); Satyam Jakkula, Bengaluru (IN)

(73) Assignee: International Business Machines Corporation, Armonk, NY (US)

( * ) Notice: Subject to any disclaimer, the term of this patent is extended or adjusted under 35 U.S.C. 154(b) by 207 days.

(21) Appl. No.: 18/356,275

(22) Filed: Jul. 21, 2023

(65) Prior Publication Data

US 2025/0029031 A1 Jan. 23, 2025

(51) Int. Cl.
| | |
|---|---|
| *G06Q 10/06* | (2023.01) |
| *G06Q 10/0631* | (2023.01) |
| *G06T 17/00* | (2006.01) |
| *G06V 20/52* | (2022.01) |

(52) U.S. Cl.
CPC ............... *G06Q 10/063116* (2013.01); *G06Q 10/063112* (2013.01); *G06T 17/00* (2013.01); *G06V 20/52* (2022.01)

(58) Field of Classification Search
CPC ............ G06Q 10/0633; G06F 2111/18; G05B 2219/32246; G05D 1/2245
See application file for complete search history.

(56) References Cited

U.S. PATENT DOCUMENTS

| | | | | |
|---|---|---|---|---|
| 9,050,723 | B1* | 6/2015 | Elazary | .................... B25J 9/163 |
| 11,651,308 | B1* | 5/2023 | Viswanathan | ..... G06Q 10/0639 |
| | | | | 705/7.14 |
| 2017/0355080 | A1 | 12/2017 | Podnar | |

(Continued)

FOREIGN PATENT DOCUMENTS

CN 106060058 A * 10/2016

OTHER PUBLICATIONS

Mourtzis et al. Augmented Reality Application to Support Remote Maintenance as a Service in the Robotics Industry, Procedia CIRP, vol. 63, 2017, pp. 46-51, ISSN 2212-8271, https://doi.org/10.1016/j.procir.2017.03.154. (Year: 2017).*

(Continued)

*Primary Examiner* — Hamzeh Obaid
*Assistant Examiner* — Reed M. Bond
(74) *Attorney, Agent, or Firm* — Cantor Colburn LLP; Stephen Yoder

(57) ABSTRACT

Computer-implemented methods for providing uninterrupted remote control of a production device are provided. Aspects include obtaining a production task to be performed using the production device, identifying a remote worker, from a remote worker database, to perform the production task via a virtual reality device, and assigning the production task to the remote worker. Aspects also include monitoring a remote worker environment of the remote worker during performance of the production task and determining that the production task needs to be reassigned. Aspects further include identifying a replacement remote worker from the remote worker database and reassigning the production task to the replacement remote worker.

16 Claims, 4 Drawing Sheets

(56) References Cited

U.S. PATENT DOCUMENTS

| | | | |
|---|---|---|---|
| 2018/0190027 A1* | 7/2018 | Yao | G06T 19/006 |
| 2019/0227312 A1* | 7/2019 | Lai | G06F 3/011 |
| 2020/0055194 A1 | 2/2020 | Kamon et al. | |
| 2020/0208510 A1* | 7/2020 | Guijt | G01V 1/40 |
| 2020/0387216 A1 | 12/2020 | Chehade et al. | |
| 2021/0053229 A1* | 2/2021 | Yuan | B25J 13/00 |
| 2021/0213620 A1 | 7/2021 | Silverstein et al. | |
| 2021/0252699 A1* | 8/2021 | Ramani | B25J 9/1671 |
| 2022/0021847 A1* | 1/2022 | Maggiore | G06F 21/6218 |
| 2022/0040844 A1* | 2/2022 | Tsurumi | B25J 9/163 |
| 2022/0317661 A1* | 10/2022 | Kaehler | G05B 23/0283 |
| 2023/0054373 A1* | 2/2023 | Brooks | G06Q 10/06311 |
| 2023/0061919 A1* | 3/2023 | Takashima | G05D 1/0011 |
| 2023/0229986 A1* | 7/2023 | Cami | G06Q 10/06312 705/7.15 |
| 2023/0376867 A1* | 11/2023 | Urano | G06Q 10/06311 |
| 2024/0140478 A1* | 5/2024 | Yoshida | H04W 4/44 |

OTHER PUBLICATIONS

"Mobile EAM with IBM Maximo Application Suite", https://www.ibm.com/products/maximo/mobile-eam, (Retrieved: Jun. 1, 2023), 7 pages.

"WIMI Hologram Academy: Virtual Reality-based Remote Vehicle Driving Technology", https://aithority.com/technology/virtual-reality-technology/wimi-hologram-academy-virtual-reality-based-remote-vehicle-driving-technology/, (Retrieved: Jul. 18, 2023), 9 pages.

Anonymous, "Augmented Reality Controlled Digital Twin Robot in Data Centers", IPCOM000259024D, IP.com, Jul. 4, 2019, 5 pages.

Anonymous, "System and Method for Augmented Reality Model-Driven Control of Robots for Remote and Autonomous Data Center Services", IPCOM000271100D, IP.com, Oct. 18, 2022, 5 pages.

Benaoumeur, et al, "Remote Control of Mobile Robot using the Virtual Reality", International Journal of Electrical and Computer Engineering (IJECE), 2015, pp. 1062-1074.

Gourlis, et al, "A holistic digital twin simulation framework for industrial facilities: BIM-based data acquisition for building energy modeling", Frontiers in Built Environment, 2022, 23 pages.

IBM Institute for Business Value, "AR and VR in the workplace", https://www.ibm.com/thought-leadership/institute-business-value/report/ar-vr-workplace, (Retrieved: Jun. 1, 2023), 5 pages.

IBM Research, "Augmented and Virtual Reality Research at IBM Watson", https://researcher.watson.ibm.com/researcher/view_group.php?id=8071, (Retrieved: Jun. 1, 2023), 7 pages.

IBM Research, "Computer Vision and Augmented Reality", https://web.archive.org/web/20210818191000/https://research.ibm.com/haifa/dept/imt/cvar/index.html, (Retrieved: Jun. 1, 2023), 7 pages.

Joshi, "AR, VR, And Other Ways of Controlling Robots", https://www.allerin.com/blog/ar-vr-and-other-ways-of-controlling-robots, (Retrieved: Jul. 18, 2023), 7 pages.

Li, et al, "AR-assisted Digital Twin-enabled Robot Collaborative Manufacturing System with Human-in-the-loop", Robotics and Computer-Integrated Manufacturing, 2022, 11 pages.

Purdy, "How the Metaverse Could Change Work", AI and Machine Learning, 2022, 13 pages.

Togias, et al, "Virtual reality environment for industrial robot control and path design", Elsevier, ScienceDirect, 31st CIRP Design Conference, 2021, 6 pages.

\* cited by examiner

100 ⬎

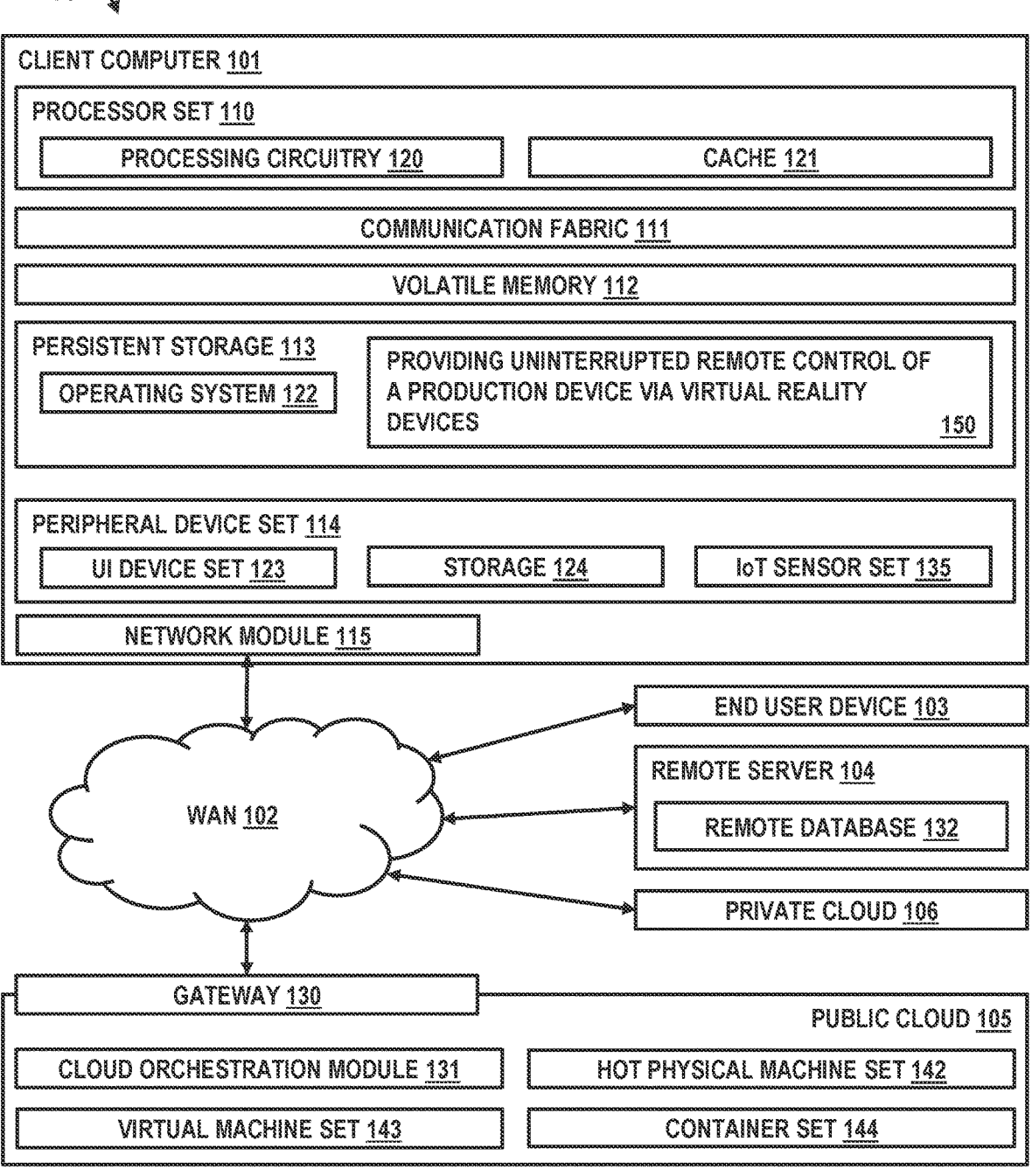

CLIENT COMPUTER 101

PROCESSOR SET 110

PROCESSING CIRCUITRY 120  CACHE 121

COMMUNICATION FABRIC 111

VOLATILE MEMORY 112

PERSISTENT STORAGE 113

OPERATING SYSTEM 122

PROVIDING UNINTERRUPTED REMOTE CONTROL OF A PRODUCTION DEVICE VIA VIRTUAL REALITY DEVICES 150

PERIPHERAL DEVICE SET 114

UI DEVICE SET 123  STORAGE 124  IoT SENSOR SET 135

NETWORK MODULE 115

WAN 102

END USER DEVICE 103

REMOTE SERVER 104

REMOTE DATABASE 132

PRIVATE CLOUD 106

GATEWAY 130

PUBLIC CLOUD 105

CLOUD ORCHESTRATION MODULE 131  HOT PHYSICAL MACHINE SET 142

VIRTUAL MACHINE SET 143  CONTAINER SET 144

FIG. 1

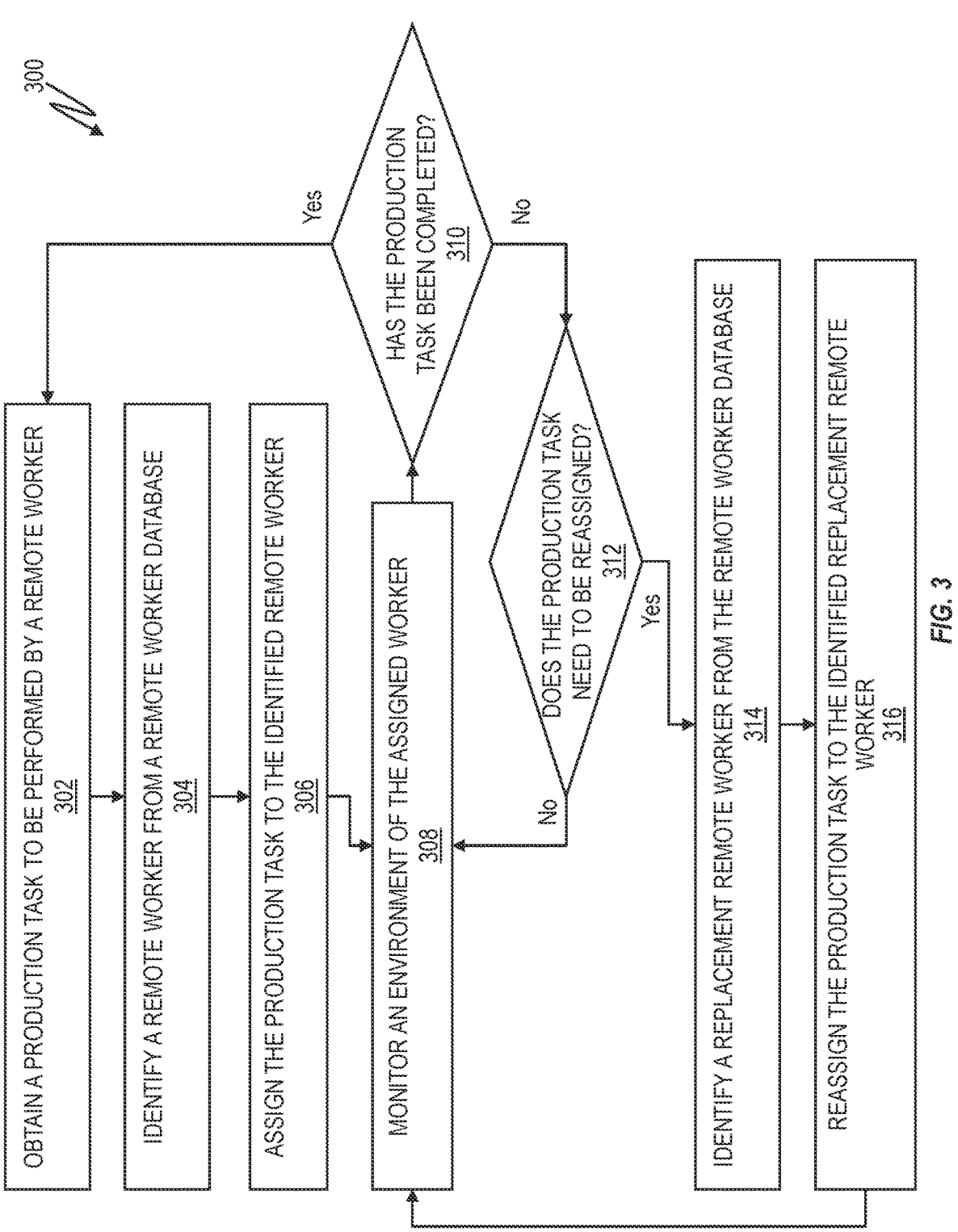

300

OBTAIN A PRODUCTION TASK TO BE PERFORMED BY A REMOTE WORKER
302

IDENTIFY A REMOTE WORKER FROM A REMOTE WORKER DATABASE
304

ASSIGN THE PRODUCTION TASK TO THE IDENTIFIED REMOTE WORKER
306

MONITOR AN ENVIRONMENT OF THE ASSIGNED WORKER
308

HAS THE PRODUCTION TASK BEEN COMPLETED?
310

Yes

No

DOES THE PRODUCTION TASK NEED TO BE REASSIGNED?
312

No

Yes

IDENTIFY A REPLACEMENT REMOTE WORKER FROM THE REMOTE WORKER DATABASE
314

REASSIGN THE PRODUCTION TASK TO THE IDENTIFIED REPLACEMENT REMOTE WORKER
316

FIG. 3

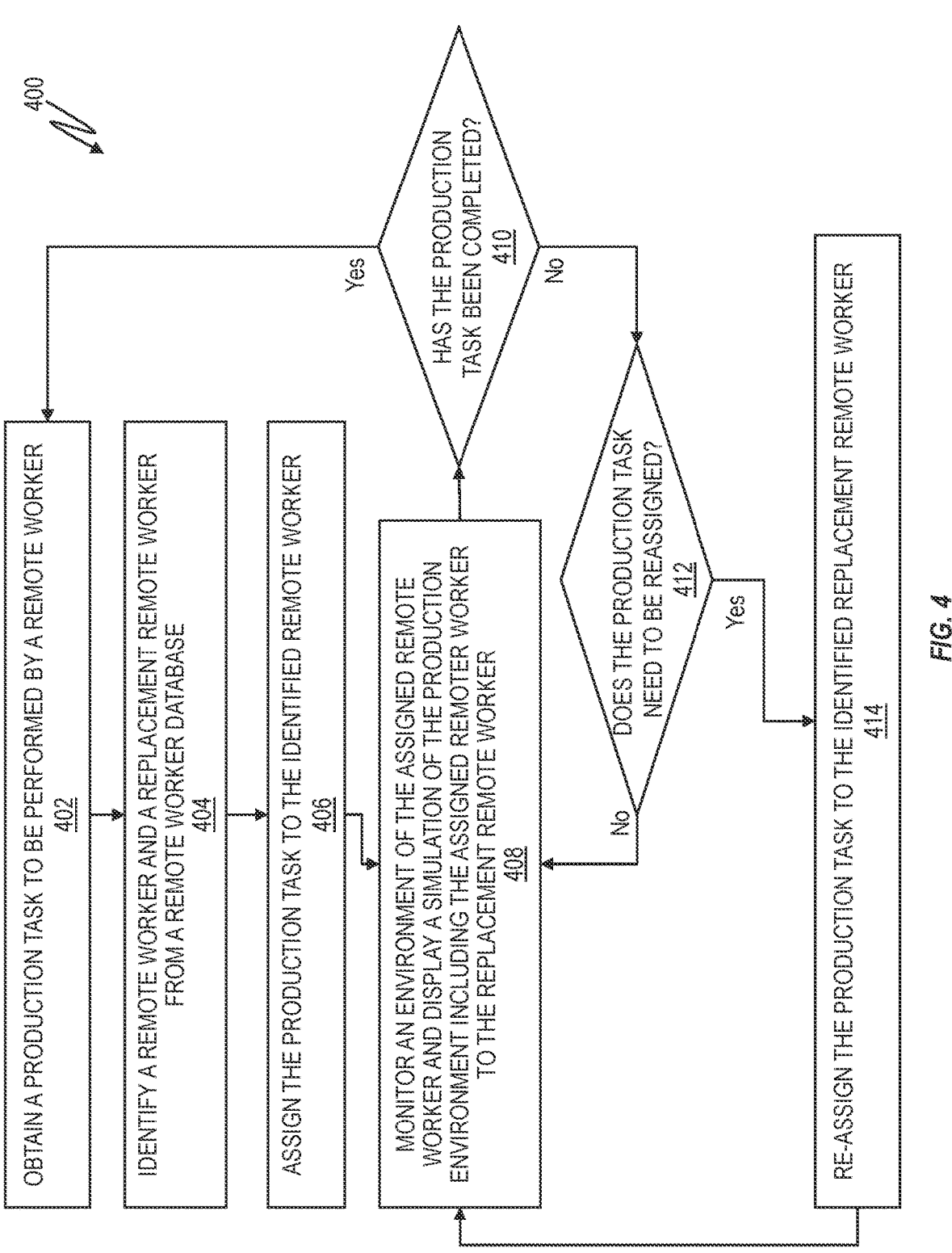

400

OBTAIN A PRODUCTION TASK TO BE PERFORMED BY A REMOTE WORKER
402

IDENTIFY A REMOTE WORKER AND A REPLACEMENT REMOTE WORKER FROM A REMOTE WORKER DATABASE
404

ASSIGN THE PRODUCTION TASK TO THE IDENTIFIED REMOTE WORKER
406

MONITOR AN ENVIRONMENT OF THE ASSIGNED REMOTE WORKER AND DISPLAY A SIMULATION OF THE PRODUCTION ENVIRONMENT INCLUDING THE ASSIGNED REMOTER WORKER TO THE REPLACEMENT REMOTE WORKER
408

HAS THE PRODUCTION TASK BEEN COMPLETED?
410

Yes

No

DOES THE PRODUCTION TASK NEED TO BE REASSIGNED?
412

No

Yes

RE-ASSIGN THE PRODUCTION TASK TO THE IDENTIFIED REPLACEMENT REMOTE WORKER
414

FIG. 4

PROVIDING UNINTERRUPTED REMOTE CONTROL OF A PRODUCTION DEVICE VIA VIRTUAL REALITY DEVICES

BACKGROUND

The present disclosure generally relates to remote control of a production device, and more specifically, to methods and systems for providing uninterrupted remote control of a production device via virtual reality devices.

Virtual reality (VR) devices create a simulated experience using three-dimensional displays to provide a user with an immersive feel of a virtual world. Applications of virtual reality include entertainment (such as watching movies or playing video games), education (such as medical or other training), and business (such as virtual meetings). Other types of VR-style technology include augmented reality (AR) and mixed reality, sometimes referred to as extended reality (XR).

Currently, VR systems use headsets or multi-projected environments to generate realistic images, sounds, and other sensations that simulate a user's physical presence in a virtual environment. A person using virtual reality equipment can look around the artificial world, move around in it, and interact with virtual features or items. Many VR systems use headsets that include a head-mounted display with a small screen in front of the eyes of a user, but VR systems can utilize specially designed rooms with multiple large screens. VR systems typically incorporate auditory and video feedback but may also allow other types of sensory and force feedback through haptic technology.

Using a VR system, a user can control a machine, such as a robot, that is located remotely from the user. However, disruptions in the physical location of the user may result in the user having to abruptly discontinue the use of the VR system, thereby interrupting the operation of the machine.

SUMMARY

Embodiments of the present disclosure are directed to computer-implemented methods for providing uninterrupted remote control of a device. According to an aspect, a computer-implemented method includes obtaining a production task to be performed using the production device, identifying a remote worker, from a remote worker database, to perform the production task via a virtual reality device, and assigning the production task to the remote worker. The method also includes monitoring a remote worker environment of the remote worker during performance of the production task and determining that the production task needs to be reassigned. The method further includes identifying a replacement remote worker from the remote worker database and reassigning the production task to the replacement remote worker.

Embodiments also include computing systems and computer program products for providing uninterrupted remote control of a device.

Additional technical features and benefits are realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the present disclosure are apparent from the following detailed description taken in conjunction with the accompanying drawings in which:

FIG. 1 depicts a block diagram of an example computer system for use in conjunction with one or more embodiments of the present disclosure;

FIG. 3 depicts a flowchart of a method for providing uninterrupted remote control of a production device via virtual reality devices in accordance with one or more embodiments of the present disclosure; and FIG. 4 depicts a flowchart of another method for providing uninterrupted remote control of a production device via virtual reality devices in accordance with one or more embodiments of the present disclosure.

DETAILED DESCRIPTION

Figure 2:
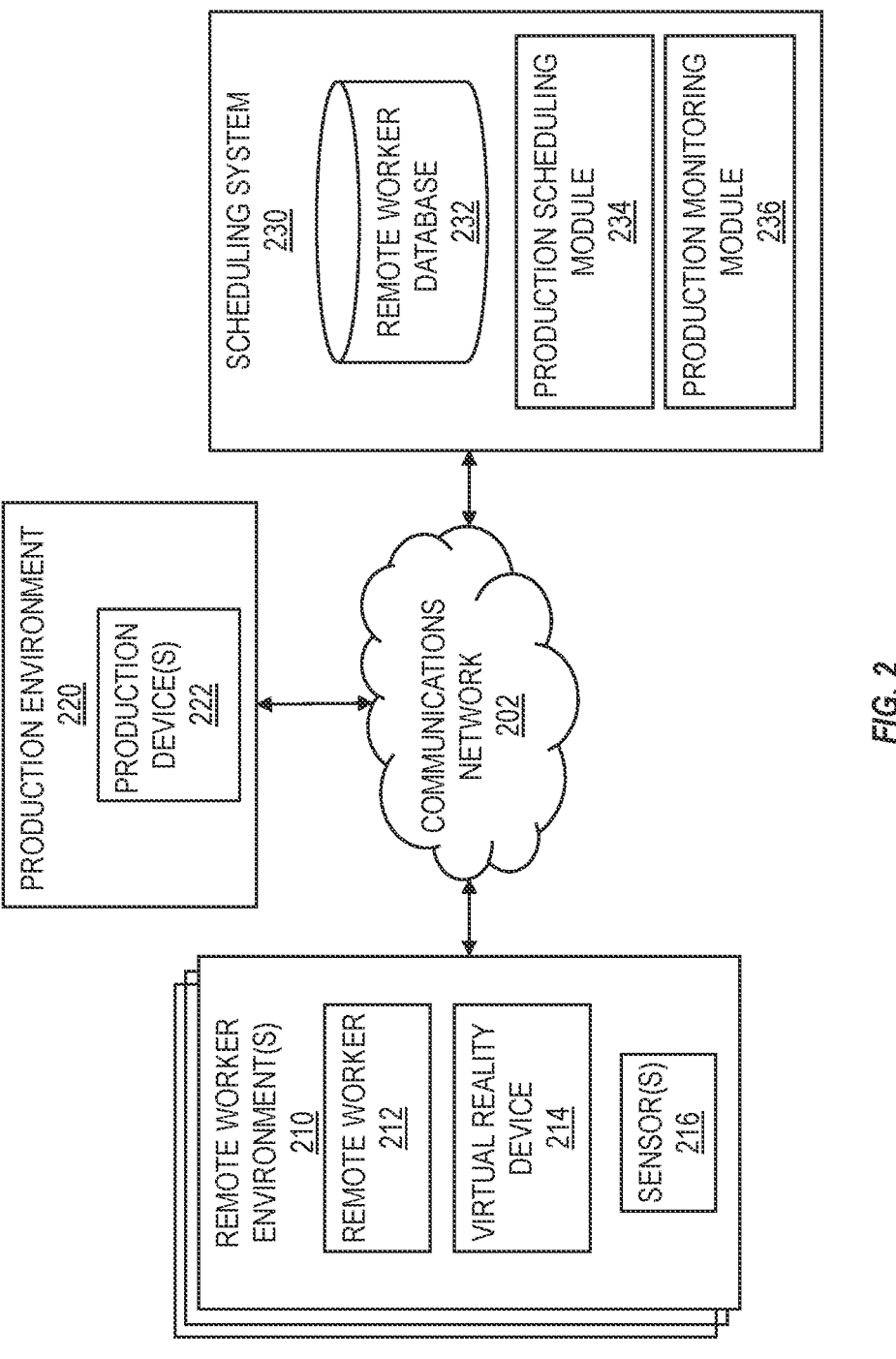
FIG. 2 depicts a block diagram of a system for providing uninterrupted remote control of a production device via virtual reality devices in accordance with one or more embodiments of the present disclosure.

As discussed above, the use of a VR system to remotely control a machine can be interrupted, often abruptly, based on disruptions in the physical location of the user of the VR system. Such abrupt interruptions of the operation of the remotely controlled machine can have negative impacts on the production environment in which the machine is located. For example, if the machine is a production device in a production environment, such an interruption can cause delays in the production environment. In addition, the abrupt interruption of the remote control of a production machine may cause damage to the production machine or workpiece being worked on by the production machine.

Exemplary embodiments include methods, systems, and computer program products for providing uninterrupted remote control of a production device via virtual reality devices. In exemplary embodiments, a production device is disposed in a production environment and is remotely controlled by a remote worker via a virtual reality device. A remote worker is assigned to perform a production task using the production device by a scheduling system that includes a database of remote workers, which includes characteristics of the environment of each of the remote workers, qualifications of each of the remote workers, and availability of each of the remote workers. In exemplary embodiments, the environment of the assigned remote worker is monitored during the production task by the scheduling system via sensors disposed in the user environment. The scheduling system is configured to determine that the production task needs to be reassigned from the remote worker, identify a replacement remote worker from the remote worker database, and reassign the production task to the replacement remote worker. In exemplary embodiments, the reassignment of the production task from the remote worker to a replacement remote worker is performed prior to any interruption in the production task to ensure continuous operation of the production device by one of the remote worker and the replacement remote worker.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as providing uninterrupted remote control of a production device via virtual reality devices 150. In addition to block 150, computing environment 100 includes, for example, computer 101, wide area network (WAN) 102, end user device (EUD) 103, remote server 104, public Cloud 105, and private Cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI), device set 123, storage 124, and Internet of Things (IoT) sensor set 125), and network module 115. Remote server 104 includes remote database 132. Public Cloud 105 includes gateway 130, Cloud orchestration module 131, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 132. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a Cloud, even though it is not shown in a Cloud in FIG. 1. On the other hand, computer 101 is not required to be in a Cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collects and store helpful and useful data for use by other computers, such as computer 101. For example, in a hypothetical case where computer 101 is designed and programmed to provide a recommendation based on historical data, then this historical data may be provided to computer 101 from remote database 132 of remote server 104.

PUBLIC CLOUD 105 is any computer system available for use by multiple entities that provides on-demand availability of computer system resources and/or other computer capabilities, especially data storage (Cloud storage) and computing power, without direct active management by the user. Cloud computing typically leverages sharing of resources to achieve coherence and economies of scale. The direct and active management of the computing resources of public Cloud 105 is performed by the computer hardware and/or software of Cloud orchestration module 131. The computing resources provided by public Cloud 105 are typically implemented by virtual computing environments that run on various computers making up the computers of host physical machine set 132, which is the universe of physical computers in and/or available to public Cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 131 manages the transfer and storage of images, deploys new instantiations of VCEs and manages active instantiations of VCE deployments. Gateway 130 is the collection of computer software, hardware, and firmware that allows public Cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public Cloud 105, except that the computing resources are only available for use by a single enterprise. While private Cloud 106 is depicted as being in communication with WAN 102, in other embodiments a private Cloud may be disconnected from the internet entirely and only accessible through a local/private network. A hybrid Cloud is a composition of multiple Clouds of different types (for example, private, community or public Cloud types), often respectively implemented by different vendors. Each of the multiple Clouds remains a separate and discrete entity, but the larger hybrid Cloud architecture is bound together by standardized or proprietary technology that enables orchestration, management, and/or data/application portability between the multiple constituent Clouds. In this embodiment, public Cloud 105 and private Cloud 106 are both part of a larger hybrid Cloud.

One or more embodiments described herein can utilize machine learning techniques to perform prediction and or classification tasks, for example. In one or more embodiments, machine learning functionality can be implemented using an artificial neural network (ANN) having the capability to be trained to perform a function. In machine learning and cognitive science, ANNs are a family of statistical learning models inspired by the biological neural networks of animals, and in particular the brain. ANNs can be used to estimate or approximate systems and functions that depend on a large number of inputs. Convolutional neural networks (CNN) are a class of deep, feed-forward ANNs that are particularly useful at tasks such as, but not limited to analyzing visual imagery and natural language processing (NLP). Recurrent neural networks (RNN) are another class of deep, feed-forward ANNs and are particularly useful at tasks such as, but not limited to, unsegmented connected handwriting recognition and speech recognition. Other types of neural networks are also known and can be used in accordance with one or more embodiments described herein.

ANNs can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in ANNs that carry electronic messages between simulated neurons are provided with numeric weights that correspond to the strength or weakness of a given connection. The weights can be adjusted and tuned based on experience, making ANNs adaptive to inputs and capable of learning. For example, an ANN for handwriting recognition is defined by a set of input neurons that can be activated by the pixels of an input image. After being weighted and transformed by a function determined by the network's designer, the activation of these input neurons are then passed to other downstream neurons, which are often referred to as "hidden" neurons. This process is repeated until an output neuron is activated. The activated output neuron determines which character was input.

A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Referring now to FIG. 2, a block diagram of a system 200 for providing uninterrupted remote control of a production device via virtual reality devices in accordance with one or more embodiments of the present disclosure is shown. As illustrated, the system 200 includes remote worker environments 210, a production environment 220 and a scheduling system 230 that are in communication with one another via a communications network 202. The communications network 202 may include a private network, a public network such as the Internet, or a combination thereof.

In exemplary embodiments, the production environment 220 includes one or more production devices 222. The production devices 222 are machines such as robots that are capable of being remotely controlled. The production devices 222 include one or more operational parameters, such as a movement path, an operational speed, and an operation direction, that are controlled by a remote worker.

In exemplary embodiments, each of the remote worker environments 210 includes a remote worker 212, a virtual reality device 214, and sensors 216. The sensors 216 are configured to monitor the remote worker environment 210. In one embodiment, the sensors 216 are configured to measure the physical characteristics of the remote worker environment 210 and the position of the remote worker 212 within the remote worker environment 210. For example, the sensors 216 can measure the distance between the remote worker and walls, furniture, other people, or other objects disposed within the remote worker environment 210. In another embodiment, the sensors are configured to measure other characteristics of the remote worker environment 210. For example, the sensors 216 can measure a power level of the virtual reality device 214, a quality of a communications link between the virtual reality device 214 and the production device 222, and the like. In a further embodiment, the environmental characteristics of the remote worker environment 210, such as the weather at the remote worker environment 210.

In exemplary embodiments, the virtual reality (VR) device 214 is one of a VR headset or multi-projected environment that is configured to generate realistic images, sounds, and other sensations to simulate the presence of the remote worker 212 in the production environment 220. The VR device 214 is further configured to present a digital twin of the production device 222 in the production environment 220 and to capture the interaction between the remote worker 212 and the digital twin of the production device 222. The VR device 214 transmits the captured interaction data between the remote worker 212 and the digital twin of the production device 222 to the production device such that the remote worker is able to physically control the production device 222 by interacting with the digital twin of the production device 222 using the VR device 214.

In exemplary embodiments, the scheduling system 230 includes a remote worker database 232, a production scheduling module 234, and a production monitoring module 236. In one embodiment, the scheduling system 230 is embodied in a computing environment 100, such as the one shown in FIG. 1. The remote worker database 232 includes a plurality of records that each correspond to a remote worker 212. Each of the records includes one or more characteristics of the remote worker environment 210, qualifications of the remote worker 212, and the availability of each the remote worker 212. The characteristics of the remote worker environment 210 include special information of the remote worker environment 210.

In exemplary embodiments, the production scheduling module 234 obtains a production task to be performed using the production device 222 and assigns a remote worker 212 to perform the production task. In exemplary embodiments, the production task includes one or more of an identification of the production device, required remote worker qualifications, expected duration of the production task, and one or more special requirements. The production scheduling module 234 identifies a remote worker 212 from the remote worker database 232 to assign the production task based on the production task requirements and the information obtained from the remote worker database 232. For example, the production scheduling module 234 may compare the characteristics of the remote worker environment of a plurality of remote workers to the one or more special requirements, the one or more qualifications of each of the plurality of remote workers to the one or more required remote worker qualifications, and the expected duration of the production task to the availability of each the plurality of remote workers.

In exemplary embodiments, the production monitoring module 236 is configured to monitor the remote worker environment 212, via sensors 216, of the assigned remote worker 212 during the performance of the production task. In one embodiment, the production monitoring module 236 monitors the proximity of the assigned remote worker 212 to one or more objects located in the remote worker environment 210. The production monitoring module 236 is configured to determine that the production task needs to be reassigned based on the monitored remote worker environment 210, such as monitored changes in the available space for movement of the remote worker 212 in the remote worker environment 210. In one embodiment, determining that the production task needs to be reassigned is based on determining that a likelihood of an interruption event occurring in the environment of the remote worker is greater than a threshold level. For example, the interruption event may include an impact between the remote worker 212 and an object in the remote worker environment 210, and the likelihood of the occurrence of the interruption event is calculated based on a projected movement of the remote worker 212 and the location of the object in the remote worker environment 210.

In exemplary embodiments, based on determining that the production task needs to be reassigned, by the production monitoring module 236, the production scheduling module 234 identifies a replacement remote worker from the remote worker database 232. The production task is then handed off from the remote worker to the identified replacement remote worker. In exemplary embodiments, the scheduling system 230 is configured to coordinate the handoff, or transition, of the production task from the remote worker to the replacement remote worker. In exemplary embodiments, the reassignment of the production task from the remote worker to a replacement remote worker is performed prior to any interruption in the production task to ensure continuous operation of the production device by one of the remote worker and the replacement remote worker.

In exemplary embodiments, during the handoff of the production task from the remote worker to the replacement remote worker a voice communications channel is established between the remote worker and the replacement remote worker to facilitate coordination of the transition of the production task from the remote worker to the replacement remote worker. In one embodiment, both the remote worker and the replacement remote worker are able to control the operation of the production device during the handoff period.

Referring now to FIG. 3 a flowchart of a method 300 for providing uninterrupted remote control of a production device via virtual reality devices in accordance with one or more embodiments of the present disclosure is shown. In exemplary embodiments, the method 300 is performed by a scheduling system 230 such as the one shown in FIG. 2.

At block 302, the method 300 includes obtaining a production task to be performed using the production device. In exemplary embodiments, the production task includes an identification of the production device, required remote worker qualifications, expected duration of the production task, and one or more special requirements for the remote worker to perform the production task.

At block 304, the method 300 includes identifying a remote worker, from a remote worker database, to perform the production task via a virtual reality device. In exemplary embodiments, the remote worker database includes a plurality of remote workers, characteristics of the remoter worker environment of each of the plurality of remote workers, one or more qualifications of each of the plurality of remote workers, and availability of each the plurality of remote workers. In one embodiment, the identification of the remote worker is based at least in part on a comparison of the characteristics of the environment of each of the plurality of remote workers to the one or more special requirements, the one or more qualifications of each of the plurality of remote workers to the one or more required worker qualifications, and the expected duration of the production task to the availability of each the plurality of remote workers.

At block 306, the method 300 includes assigning the production task to the remote worker. In one embodiment, the assignment of the production task to the remote worker includes instructing the virtual reality device of the remote worker to provide a simulation of the production environment and a digital twin of the production device for the remote worker to interact with.

At block 308, the method 300 includes monitoring a remote worker environment of the remote worker during the performance of the production task. In exemplary embodiments, one or more sensors are configured to monitor the environment of the remote worker during the performance of the production task. The sensors are configured to monitor the location of the remote worker in the remote worker environment, the spacing between the remote worker and objects in the remote worker environment, the movement of the remote worker in the remote worker environment, and the like. In some embodiments, the sensors are also configured to monitor one or more of a power level of the VR device of the remote worker, a quality of a network connection between the VR device and the production environment (such as the bandwidth or latency of the network connection), and one or more environmental conditions of the remote worker environment.

At decision block 310, the method 300 includes determining whether the production task has been completed. In one embodiment, the determination that the production task has been completed is based on feedback received from the production environment. In another embodiment, the determination that the production task has been completed is based on monitoring the remote worker and determining that the remote worker has been idle for greater than a threshold period of time. Based on a determination that the production task has been completed, the method 300 returns to block 302. Based on a determination that the production task has not been completed, the method 300 proceeds to decision block 312.

At decision block 312, the method 300 includes determining whether the production task needs to be reassigned from the remote worker. In one embodiment, a determination that the production task needs to be reassigned from the remote worker is based on determining that a likelihood of an interruption event occurring in the remote worker environment of the remote worker is greater than a threshold level. In one embodiment, the interruption event includes a projected impact between the remote worker and an object in the remote worker environment. In another embodiment, the interruption event includes a projected communications disruption between the VR device and the production environment, such as a reduction of the bandwidth of a network connection below a minimum level or an increase in the latency of the network connection above a maximum level. In another embodiment, the interruption event includes a projected loss of power to the VR device. In exemplary embodiments, the likelihood of an occurrence of an interruption event is calculated by a production monitoring module based on data received from sensors in the remote worker environment. In addition, the threshold level associated with the likelihood of the occurrence of an interruption event is set by the production monitoring module. Based on a determination that the production task does not need to be reassigned, the method 300 returns to block 308. Based on a determination that the production task needs to be reassigned, the method 300 proceeds to block 314.

In exemplary embodiments, the method may also include providing a warning to the remote worker regarding an interruption event. For example, if the interruption event is an expected impact between the remote worker and an object in the remote worker environment, the VR device may be configured to deactivate the simulation of the production environment and to provide a warning to the remote worker regarding the expected impact to allow the user to avoid the expected impact.

At block 314, the method 300 includes identifying a replacement remote worker from the remote worker database. In one embodiment, the identification of the replacement remote worker is based at least in part on a comparison of the characteristics of the environment of a plurality of remote workers to the one or more special requirements of the production task, the one or more qualifications of each of the plurality of remote workers to the one or more required worker qualifications of the production task, and remaining duration of the production task to the availability of each the plurality of remote workers.

At block 316, the method 300 includes reassigning the production task to the replacement remote worker. In one embodiment, reassigning the production task to the replacement remote worker includes performing a handoff of the production task from the remote worker to the replacement remote worker. In one embodiment, a voice communications channel is established between the remote worker and the replacement remote worker during the handoff to allow the remote worker to communicate with the replacement remote worker. In one embodiment, the duration of the handoff is determined at least in part based on an expected amount of time between the reassignment and the expected interruption event.

In exemplary embodiments, the re-assignment of the production task to the replacement remote worker includes instructing the virtual reality device of the replacement remote worker to provide a simulation of the production environment and a digital twin of the production device for the replacement remote worker to interact with. In exemplary embodiments, the re-assignment of the production task is performed prior to the occurrence of the expected interruption event.

Referring now to FIG. 4 a flowchart of a method 400 for providing uninterrupted remote control of a production device via virtual reality devices in accordance with one or more embodiments of the present disclosure is shown. In exemplary embodiments, the method 400 is performed by a scheduling system 230 such as the one shown in FIG. 2.

At block 402, the method 400 includes obtaining a production task to be performed using the production device. In exemplary embodiments, the production task includes an identification of the production device, required remote worker qualifications, expected duration of the production task, and one or more special requirements for the remote worker to perform the production task.

At block 404, the method 400 includes identifying a remote worker to perform the production task via a virtual reality device and a replacement remote worker from a remote worker database. In exemplary embodiments, the remote worker database includes a plurality of remote workers, characteristics of the remoter worker environment of each of the plurality of remote workers, one or more qualifications of each of the plurality of remote workers, and availability of each of the plurality of remote workers. In one embodiment, the identification of the remote worker is based at least in part on a comparison of the characteristics of the environment of each of the plurality of remote workers to the one or more special requirements, the one or more qualifications of each of the plurality of remote workers to the one or more required worker qualifications, and the expected duration of the production task to the availability of each the plurality of remote workers.

At block 406, the method 400 includes assigning the production task to the identified remote worker. In one embodiment, the assignment of the production task to the identified remote worker includes instructing the virtual reality device of the remote worker to provide a simulation of the production environment and a digital twin of the production device for the remote worker to interact with.

At block 408, the method 400 includes monitoring a remote worker environment of the remote worker during the performance of the production task and displaying a simulation of the production environment including the assigned remote worker to the replacement remote worker. In exemplary embodiments, the VR device of the replacement remote worker displays the production environment including the assigned remote worker while the assigned remote worker is performing the production task. As a result, the replacement remote worker is able to follow the progress of the remote worker during the production task and can take over the production task from the remote worker if an unexpected interruption event occurs.

In exemplary embodiments, one or more sensors are configured to monitor the environment of the remote worker during the performance of the production task. The sensors are configured to monitor the location of the remote worker in the remote worker environment, the spacing between the remote worker and objects in the remote worker environment, the movement of the remote worker in the remote worker environment, and the like. In some embodiments, the sensors are also configured to monitor one or more of a power level of the VR device of the remote worker, a quality of a network connection between the VR device and the production environment (such as the bandwidth or latency of the network connection), and one or more environmental conditions of the remote worker environment.

At decision block 410, the method 400 includes determining whether the production task has been completed. In one embodiment, the determination that the production task has been completed is based on feedback received from the production environment. In another embodiment, the determination that the production task has been completed is based on monitoring the remote worker and determining that the remote worker has been idle for greater than a threshold period of time. Based on a determination that the production task has been completed, the method 400 returns to block 402. Based on a determination that the production task has not been completed, the method 400 proceeds to decision block 412.

At decision block 412, the method 400 includes determining whether the production task needs to be reassigned from the remote worker. In one embodiment, a determination that the production task needs to be reassigned from the remote worker is based on determining that a likelihood of an interruption event occurring in the remote worker environment of the remote worker is greater than a threshold level. In one embodiment, the interruption event includes a projected impact between the remote worker and an object in the remote worker environment. In another embodiment, the interruption event includes a projected communications disruption between the VR device and the production environment, such as a reduction of the bandwidth of a network connection below a minimum level or an increase in the latency of the network connection above a maximum level. In another embodiment, the interruption event includes a projected loss of power to the VR device. In exemplary embodiments, the likelihood of an occurrence of an interruption event is calculated by a production monitoring module based on data received from sensors in the remote worker environment. In addition, the threshold level associated with the likelihood of the occurrence of an interruption event is set by the production monitoring module. Based on a determination that the production task does not need to be reassigned, the method 400 returns to block 408. Based on a determination that the production task needs to be reassigned, the method 400 proceeds to block 414.

At block 414, the method 400 includes reassigning the production task to the replacement remote worker. In one embodiment, reassigning the production task to the replacement remote worker includes performing a handoff of the production task from the remote worker to the replacement remote worker. In one embodiment, both the remote worker and the replacement remote worker are able to control the operation of the production device during the handoff period.

Various embodiments are described herein with reference to the related drawings. Alternative embodiments can be devised without departing from the scope of the present disclosure. Various connections and positional relationships (e.g., over, below, adjacent, etc.) are set forth between elements in the following description and in the drawings.

These connections and/or positional relationships, unless specified otherwise, can be direct or indirect, and the present disclosure is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the present disclosure may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A method for providing uninterrupted remote control of a production device comprising:

obtaining a production task to be performed using the production device;

identifying a remote worker, from a remote worker database, to perform the production task via a virtual reality device;

assigning the production task to the remote worker, wherein the virtual reality device generates realistic images and sounds to simulate the presence of the remote worker in a production environment, presents a digital twin of the production device in the production environment, and captures interaction between the remote worker and the digital twin of the production device, wherein the virtual reality device transmits the captured interaction data between the remote worker and the digital twin of the production device to the production device such that the remote worker causes one or more sensors to physically control the production device by interacting with the digital twin of the production device using the virtual reality device, wherein the virtual reality device generates, in real time, control signals corresponding to operational parameters of the production device, including at least movement path, operational speed, and operation direction, and to transmit the control signals to the production device for execution, thereby effecting a transformation of the production device;

monitoring a remote worker environment of the remote worker during performance of the production task, wherein one or more sensors monitor a location of the remote worker in the remote worker environment, spacing between the remote worker and objects in the remote worker environment, movement of the remote worker in the remote worker environment, a power level of the virtual reality device, and a quality of a network connection between the virtual reality device and the production environment;

determining that the production task needs to be reassigned, wherein determining that the production task needs to be reassigned comprises obtaining multichannel time-series data from the one or more sensors, inputting the time-series data into a trained artificial neural network selected from the group consisting of a convolutional neural network and a recurrent neural network, generating, by the artificial neural network, a quantitative risk score representing a likelihood of an interruption event occurring in the remote worker environment, and comparing the risk score to a threshold to determine whether the production task needs to be reassigned, wherein the interruption event includes one of a projected impact between the remote worker and an object in the remote worker environment, a projected communications disruption between the virtual reality device and the production device, and a projected loss of power to the virtual reality device;

identifying a replacement remote worker from the remote worker database; and reassigning the production task to the replacement remote worker, wherein reassigning the production task to the replacement remote worker includes performing a handoff of the production task from the remote worker to the replacement remote worker, wherein a voice communications channel is established between the remote worker and the replacement remote worker during the handoff, wherein both the remote worker and the replacement remote worker cause one or more sensors to physically control the operation of the production device during the handoff period, wherein a duration of the handoff is determined at least in part based on an expected amount of time between the reassignment and the expected interruption event, and wherein the reassignment of the production task to the replacement remote worker includes instructing the virtual reality device of the replacement remote worker to provide a simulation of the production environment and a digital twin of the production device for the replacement remote worker to interact with, wherein a scheduling system coordinates the handoff, wherein, during the handoff, the virtual reality device of the replacement remote worker displays a simulation of the production environment including the assigned remote worker, and wherein the reassignment is performed prior to any interruption in the production task to ensure continuous operation of the production device by one of the remote worker and the replacement remote worker.

2. The method of claim 1, wherein the remote worker database includes a plurality of remote workers, characteristics of the remote worker environment of each of the plurality of remote workers, one or more qualifications of each of the plurality of remote workers, and an availability of each the plurality of remote workers.

3. The method of claim 2, wherein the production task includes one or more required remote worker qualifications, an expected duration of the production task, and one or more special requirements and wherein identification of the remote worker is based on a comparison of the character- istics of the remote worker environment of each of the plurality of remote workers to the one or more special requirements, the one or more qualifications of each of the plurality of remote workers to the one or more required remote worker qualifications, and the expected duration of the production task to the availability of each the plurality of remote workers.

4. The method of claim 1, wherein one or more sensors monitor the remote worker environment during performance of the production task and wherein determining that the production task needs to be reassigned comprises determin- ing that a likelihood of an interruption event occurring in the remote worker environment of the remote worker is greater than a threshold level based on monitored changes in available space for movement of the remote worker in the remote worker environment.

5. The method of claim 4, wherein the interruption event includes an expected impact between the remote worker and an object in the remote worker environment.

6. The method of claim 5, further comprising providing a warning to the remote worker regarding the expected impact and deactivating the virtual reality device of the remote worker.

7. The method of claim 1, wherein the virtual reality device provides the remote worker with a digital twin simulation of a production environment including the pro- duction device and operational parameters of the production device comprising a movement path, an operational speed, and an operation direction.

8. A computing system having a memory having com- puter readable instructions and one or more processors for executing the computer readable instructions, the computer readable instructions controlling the one or more processors to perform operations comprising:

obtaining a production task to be performed using a production device;

identifying a remote worker, from a remote worker data- base, to perform the production task via a virtual reality device;

assigning the production task to the remote worker, wherein the virtual reality device generates realistic images and sounds to simulate the presence of the remote worker in a production environment, presents a digital twin of the production device in the production environment, and captures interaction between the remote worker and the digital twin of the production device, wherein the virtual reality device transmits the captured interaction data between the remote worker and the digital twin of the production device to the production device such that the remote worker causes one or more sensors to physically control the produc- tion device by interacting with the digital twin of the production device using the virtual reality device, wherein the virtual reality device generates, in real time, control signals corresponding to operational parameters of the production device, including at least movement path, operational speed, and operation direc- tion, and to transmit the control signals to the produc- tion device for execution, thereby effecting a transfor- mation of the production device;

monitoring a remote worker environment of the remote worker during performance of the production task, wherein one or more sensors monitors a location of the remote worker in the remote worker environment, spacing between the remote worker and objects in the remote worker environment, movement of the remote worker in the remote worker environment, a power level of the virtual reality device, and a quality of a network connection between the virtual reality device and the production environment;

determining that the production task needs to be reas- signed, wherein determining that the production task needs to be reassigned comprises obtaining multi- channel time-series data from the one or more sensors, inputting the time-series data into a trained artificial neural network selected from the group consisting of a convolutional neural network and a recurrent neural network, generating, by the artificial neural network, a quantitative risk score representing a likelihood of an interruption event occurring in the remote worker envi- ronment, and comparing the risk score to a threshold to determine whether the production task needs to be reassigned, wherein the interruption event includes one of a projected impact between the remote worker and an object in the remote worker environment, a pro- jected communications disruption between the virtual reality device and the production device, and a pro- jected loss of power to the virtual reality device;

identifying a replacement remote worker from the remote worker database; and reassigning the production task to the replacement remote worker, wherein reassigning the production task to the replacement remote worker includes performing a handoff of the production task from the remote worker to the replacement remote worker, wherein a voice communications channel is established between the remote worker and the replacement remote worker during the handoff, wherein both the remote worker and the replacement remote worker cause one or more sensors to physically control the operation of the production device during the handoff period, wherein a duration of the handoff is determined at least in part based on an expected amount of time between the reassignment and the expected interruption event, and wherein the reassignment of the production task to the replacement remote worker includes instructing the virtual reality device of the replacement remote worker to provide a simulation of the production environment and a digital twin of the production device for the replacement remote worker to interact with, wherein a scheduling system coordinates the handoff, wherein, during the handoff, the virtual reality device of the replacement remote worker displays a simulation of the production environment including the assigned remote worker, and wherein the reassignment is per- formed prior to any interruption in the production task to ensure continuous operation of the production device by one of the remote worker and the replacement remote worker.

9. The computing system of claim 8, wherein the remote worker database includes a plurality of remote workers, characteristics of the remote worker environment of each of the plurality of remote workers, one or more qualifications of each of the plurality of remote workers, and an availabil- ity of each the plurality of remote workers.

10. The computing system of claim 9, wherein the pro- duction task includes one or more required remote worker qualifications, an expected duration of the production task, and one or more special requirements and wherein identi- fication of the remote worker is based on a comparison of the characteristics of the remote worker environment of each of the plurality of remote workers to the one or more special requirements, the one or more qualifications of each of the plurality of remote workers to the one or more required remote worker qualifications, and the expected duration of the production task to the availability of each the plurality of remote workers.

11. The computing system of claim 8, wherein one or more sensors monitors the remote worker environment during performance of the production task and wherein determining that the production task needs to be reassigned comprises determining that a likelihood of an interruption event occurring in the remote worker environment of the remote worker is greater than a threshold level based on monitored changes in available space for movement of the remote worker in the remote worker environment.

12. The computing system of claim 11, wherein the interruption event includes an expected impact between the remote worker and an object in the remote worker environment.

13. The computing system of claim 12, wherein the operations further comprise providing a warning to the remote worker regarding the expected impact and deactivating the virtual reality device of the remote worker.

14. The computing system of claim 8, wherein the virtual reality device provides the remote worker with a digital twin simulation of a production environment including the production device and operational parameters of the production device comprising a movement path, an operational speed, and an operation direction.

15. A computer program product comprising a computer readable storage medium having program instructions embodied therewith, the program instructions executable by a processor to cause the processor to perform operations comprising:

obtaining a production task to be performed using a production device;

identifying a remote worker, from a remote worker database, to perform the production task via a virtual reality device;

assigning the production task to the remote worker, wherein the virtual reality device generates realistic images and sounds to simulate the presence of the remote worker in a production environment, presents a digital twin of the production device in the production environment, and captures interaction between the remote worker and the digital twin of the production device, wherein the virtual reality device transmits the captured interaction data between the remote worker and the digital twin of the production device to the production device such that the remote worker causes one or more sensors to physically control the production device by interacting with the digital twin of the production device using the virtual reality device, wherein the virtual reality device generates, in real time, control signals corresponding to operational parameters of the production device, including at least movement path, operational speed, and operation direction, and to transmit the control signals to the production device for execution, thereby effecting a transformation of the production device;

monitoring a remote worker environment of the remote worker during performance of the production task, wherein one or more sensors monitor a location of the remote worker in the remote worker environment, spacing between the remote worker and objects in the remote worker environment, movement of the remote worker in the remote worker environment, a power level of the virtual reality device, and a quality of a network connection between the virtual reality device and the production environment;

determining that the production task needs to be reassigned, wherein determining that the production task needs to be reassigned comprises obtaining multichannel time-series data from the one or more sensors, inputting the time-series data into a trained artificial neural network selected from the group consisting of a convolutional neural network and a recurrent neural network, generating, by the artificial neural network, a quantitative risk score representing a likelihood of an interruption event occurring in the remote worker environment, and comparing the risk score to a threshold to determine whether the production task needs to be reassigned, wherein the interruption event includes one of a projected impact between the remote worker and an object in the remote worker environment, a projected communications disruption between the virtual reality device and the production device, and a projected loss of power to the virtual reality device;

identifying a replacement remote worker from the remote worker database; and reassigning the production task to the replacement remote worker, wherein reassigning the production task to the replacement remote worker includes performing a handoff of the production task from the remote worker to the replacement remote worker, wherein a voice communications channel is established between the remote worker and the replacement remote worker during the handoff, wherein both the remote worker and the replacement remote worker causes one or more sensors to physically control the operation of the production device during the handoff period, wherein a duration of the handoff is determined at least in part based on an expected amount of time between the reassignment and the expected interruption event, and wherein the reassignment of the production task to the replacement remote worker includes instructing the virtual reality device of the replacement remote worker to provide a simulation of the production environment and a digital twin of the production device for the replacement remote worker to interact with, wherein a scheduling system coordinates the handoff, wherein, during the handoff, the virtual reality device of the replacement remote worker displays a simulation of the production environment including the assigned remote worker, and wherein the reassignment is performed prior to any interruption in the production task to ensure continuous operation of the production device by one of the remote worker and the replacement remote worker.

16. The computer program product of claim 15, wherein the remote worker database includes a plurality of remote workers, characteristics of the remote worker environment of each of the plurality of remote workers, one or more qualifications of each of the plurality of remote workers, and an availability of each the plurality of remote workers.

* * * * *